United States Patent

[11] 3,631,882

| [72] | Inventor | William Kenneth White, Jr.<br>Westport, Conn. |
|---|---|---|
| [21] | Appl. No. | 6,743 |
| [22] | Filed | Jan. 29, 1970 |
| [45] | Patented | Jan. 4, 1972 |
| [73] | Assignee | Grinnell Corporation<br>Providence, R.I. |

[54] DIAPHRAGM VALVE
2 Claims, 5 Drawing Figs.

[52] U.S. Cl............................................... 137/312,
251/331
[51] Int. Cl......................................................... F16k 7/16
[50] Field of Search............................................ 251/331;
137/312

[56] References Cited
UNITED STATES PATENTS

| 2,725,211 | 11/1955 | Boteler............... | 251/331 X |
| 3,349,795 | 10/1967 | Matsutani............ | 251/331 X |
| 1,042,745 | 10/1912 | Zahm.................. | 137/312 X |

FOREIGN PATENTS

| 102,401 | 9/1962 | Netherlands......... | 251/331 |

*Primary Examiner*—Arnold Rosenthal
*Attorney*—H. Edward Foerch

ABSTRACT: A diaphragm valve having an inert diaphragm and the resilient backing sheet in which a means is providing for applying a direct lifting force to both the diaphragm and the backing sheet.

INVENTOR.
WILLIAM K. WHITE, JR.

DIAPHRAGM VALVE

BACKGROUND OF THE INVENTION

1. Field of the Invention

Diaphragm valves are frequently of a type having a diaphragm which is unaffected by corrosive fluids and having a resilient backing between the diaphragm and the compressor which transmits the closing force for the valve. Polytetrafluoroethylene (hereinafter TFE) is a usual material for these diaphragms because of its inert properties and a usual backing sheet material is an elastomer.

There diaphragm valves are called upon often to operate toward an open position under vacuum and/or high-temperature conditions in the fluid passage. However, high temperatures cause the TFE to soften and reduce its tensile strength. On the other hand, high temperatures cause an increase in the flex resistance of the backing sheet. Further, the opening force is applied by the actuating mechanism directly and solely on a stud which is embedded in the TFE diaphragm. The result has been a short operational life of the diaphragm due to stud pullout under vacuum and high-temperature conditions.

2. Description of the Prior Art

Prior to this invention no special provisions were made for providing a direct lifting force on both the diaphragm and the backing sheet of a diaphragm valve. There is usually a central backing sheet opening to accommodate a tube nut by which the stud in the diaphragm is connected to the compressor, and it has been necessary to permit relative movement between the central opening and the tube nut so that during closing of the valve no closing force is transmitted directly to the stud in the diaphragm. All lifting required to open the valve has been accomplished by pulling on a stud embedded in the diaphragm, relying on the diaphragm to lift the backing sheet.

The prior solution to the problem of stud pullout has been to increase the thickness of the diaphragm, or at least that portion of the diaphragm around the stud, when the diaphragm was intended for use in applications where vacuum and high temperatures are likely to be experienced. However, thickening the TFE diaphragm greatly reduces its flexibility and usefulness at reduced temperatures. As a result, it has been necessary to stock diaphragms for different vacuum and temperature ranges.

SUMMARY OF THE INVENTION

The present invention solves this problem by eliminating the force required to lift or flex the backing sheet from the lifting forces which are applied to the diaphragm stud. In particular, the present invention provides a flange in the backing sheet which acts to lift the backing sheet while retaining the required relative movement between the backing sheet and the tube nut.

OBJECTS

Accordingly, it is an object of the present invention to provide a diaphragm valve which has means for applying a direct lifting force on both the diaphragm and the backing sheet.

Another object is to extend the rating for a diaphragm of a diaphragm valve under vacuum and temperature conditions.

Another object is to reduce pullout forces on a diaphragm valve without increasing diaphragm stiffness.

Another object is to extend the rating for a plastic diaphragm of a diaphragm valve under vacuum and temperature conditions by distributing the pullout forces over two diaphragm studs.

Other objects will appear hereinafter.

The best modes in which I have contemplated applying the principles of the present invention are shown in the accompanying drawings but these are to be deemed primarily illustrative for it is intended that the claims shall cover by suitable expression in the appended claims whatever of patentable subject matter resides in the invention disclosed.

DESCRIPTION OF THE PREFERRED EMBODIMENT

Figure 1:
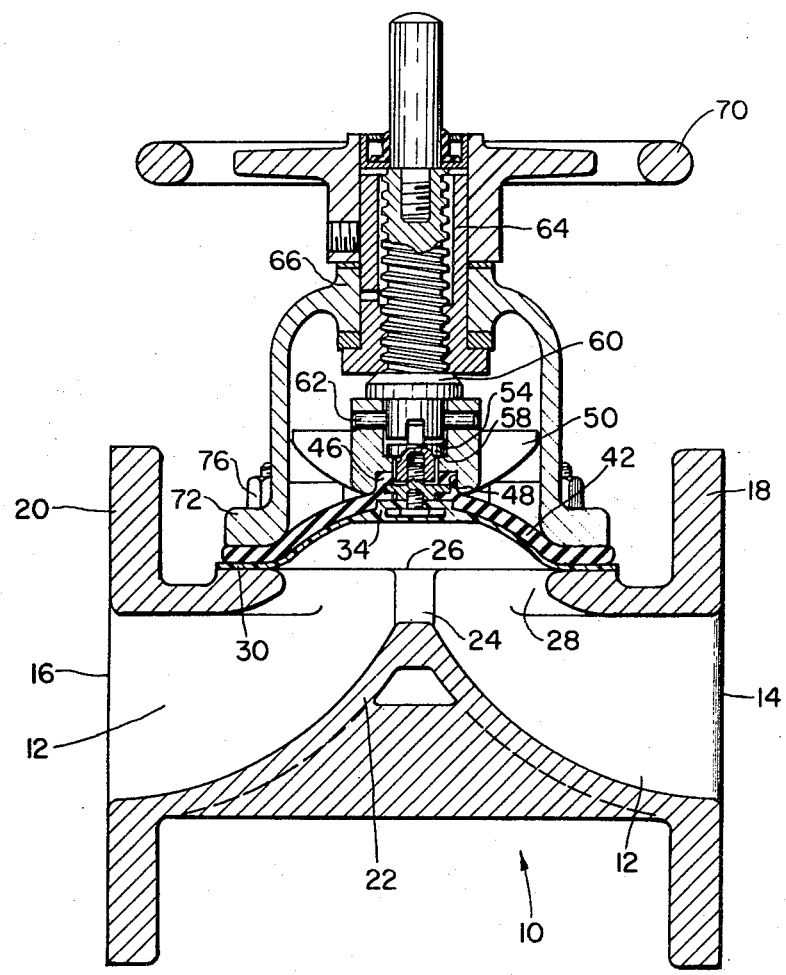
FIG. 1 is a cross sectioned side elevation view of a diaphragm valve embodying the present invention, with the valve shown in the open position.

Referring to the drawings, FIG. 1 shows a diaphragm valve suitable for handling corrosive fluids under vacuum and high-temperature conditions. This valve has a body 10 with a passage 12 extending therethrough between end 14 and 16. These ends have flanges on pipe, tanks or other fluid containing devices (not shown) in the fluid handling system.

The passage 12 is deflected at about its center by a weir 22 which extends part way into the passage from one side of the body and has a concaved surface 24 serving as a diaphragm seat. The ends of this surface blend smoothly into the flat surface 26 of a flange 27 surrounding a diaphragm opening 28 in the body on the side opposite the weir.

Figure 2:
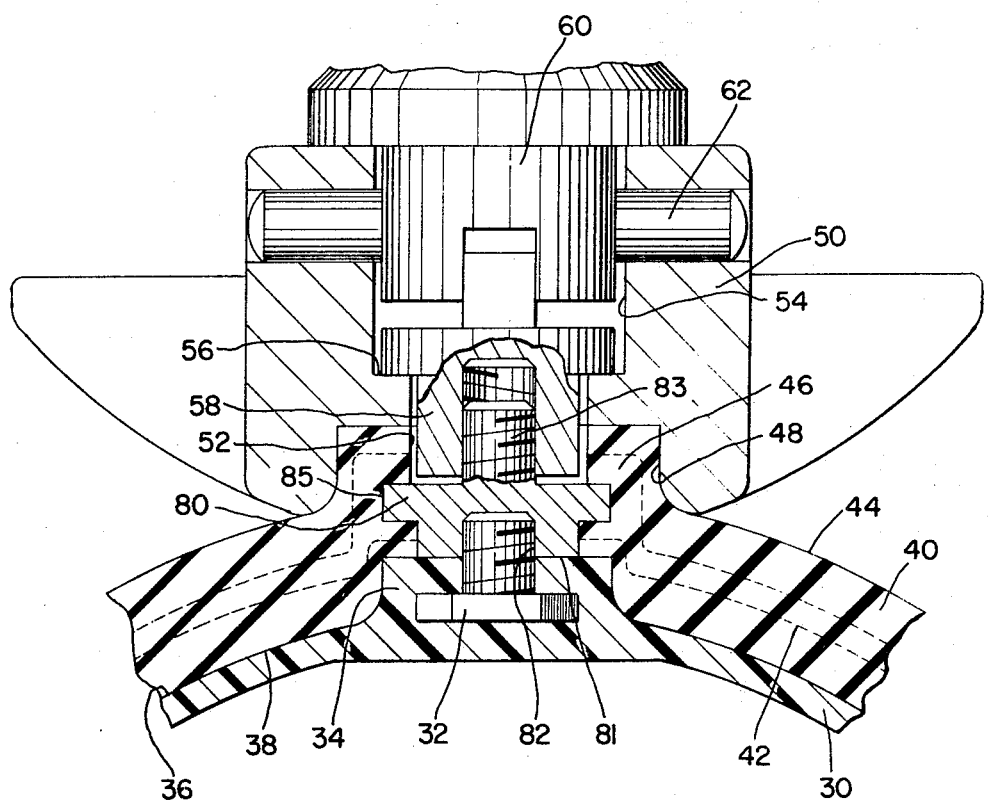
FIG. 2 is an enlarged fragmentary view of a portion of FIG. 1.

The diaphragm 30, is molded TFE. The head of a metal stud 32 (see FIG. 2) is embedded in a boss 34 formed on the backside 36 of the diaphragm at its domed center. This backside is shaped to fit nicely against the "face" 38 of a relatively thick elastomeric backing sheet 40. This backing sheet 40 is also molded and has at least one layer of fabric reinforcement 42 located between its face 38 and backside 44. In FIG. 2, two layers of fabric reinforcement are shown. This reinforcement is molded in and extends throughout all parts of the backing sheet. It gives the backing sheet the strength to prevent the TFE and elastomer from ballooning under the pressure of the controlled fluid. This embedded reinforcing fabric does not appear at the "face" of the backing sheet at any point.

The backing sheet also has a central boss 46 formed on its backside 44 and fitted nicely into a recess 48 in the bottom of a metal compressor 50. This boss has an aperture or passage 52 therethrough aligned with another passage 54 through the compressor. The latter passage is stepped inwardly adjacent the recess 48 to form a metal shoulder 56. A tube nut 58 lies in these passages with its head overlaying the shoulder 56.

The lower end of a spindle 60 is received in the upper, larger portion of the compressor passage 54 and is pivotally connected there by a cross pin 62. The upper end of the spindle is, in turn, threaded into a bushing 64 which is rotatably mounted in the bonnet 66. A flange 68 on the lower end of the bushing and a handwheel 70 secured to its upper end prevent its axial movement.

The lower edge of the bonnet 66 is flanged at 72 and engages the backing sheet margin 74. Bolts 76 secure the bonnet to the body. They clamp the backing sheet margin to the diaphragm margin 77 and the diaphragm margin to the body flange surface 26. They are tightened until a seal is achieved between this latter margin and this surface.

In the embodiment of FIGS. 1 and 2, means are provided for transmitting lifting forces directly from the actuating mechanism in the bonnet to the backing sheet 40 and to the stud 32 during operation of the valve toward its open position. These means comprise a flange 80 which is embedded in the backing sheet closely adjacent to the face 38 of the backing sheet 40 and includes an annular portion 85 which extends laterally between the surfaces of the central boss 46 of the backing sheet 40. A bore 82 is provided in the lower end of the flange 80. This bore 82 extends into the flange 80 for a depth which is sufficient to receive the stud 32 and to hold the boss 34 securely against the backing sheet 40.

A threaded shank 83 extends upwardly and coaxially of the flange 80 for threaded engagement with the tube not 58. A sufficient thickness of the backing sheet is present above the flange 80 to take up the compressive force of the compressor during the closing of the valve. Also, clearance is provided between the passage 52 and the tube nut 58 to permit relative movement therebetween.

It will be seen that during operation of the handle 70 in the proper direction to raise the spindle 60, the spindle will carry with it the compressor 50 and the tube nut 58. As the tube nut 58 rises, it lifts the flange 80 which in turn lifts the backing sheet 40 by the forces which are transmitted directly by the flange portion 85 to the central boss 46 of the backing sheet. The tube nut 58 further transmits lifting forces to the stud 32 which is embedded in the diaphragm 30 thereby raising the diaphragm 30 toward a valve-open position.

When the valve is operated toward a valve-closed position, the spindle 60 lowers the compressor which pushes the backing sheet 40 and the diaphragm 30 in the direction of the weir 22 to close the passage 12 to fluid flow. Because the head of the tube nut 58 is free to move axially of the compressor away from the shoulder 56 as the compressor moves downwardly, it does not apply a force on the tube nut 58 as the valve is closed and the portion of the backing sheet 58 above the flange portion 85 is compressed without applying a force on the stud 32. Such a force would be objectionable since it could push the stud through the inner surface of the diaphragm 30.

One further advantage of the present backing sheet having the flange embedded therein is that the flange 80 seals the center aperture of the backing sheet 40 to fluid flow. This feature may be taken advantage of in the modifications shown in FIGS. 3, 4 and 5.

Figure 3:
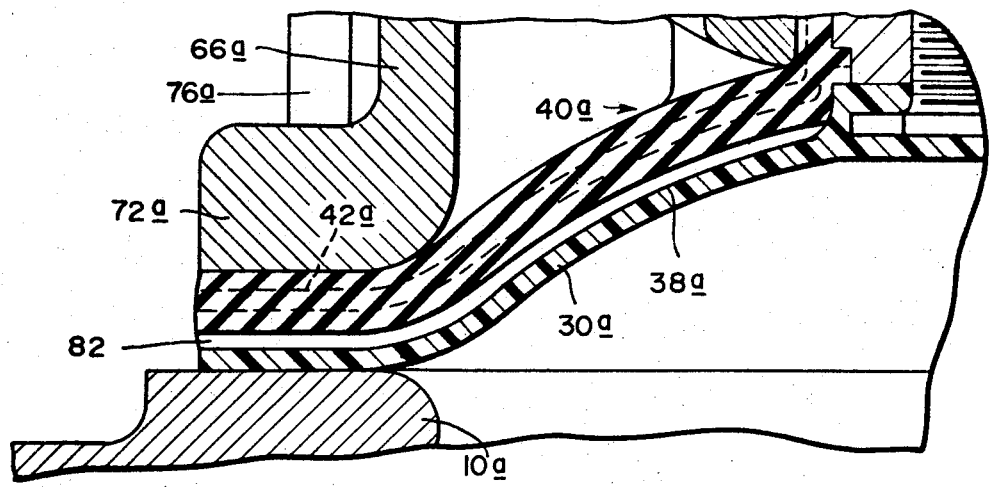
FIG. 3 is an enlarge fragmentary view of a portion of FIG. 1, and showing a modification of the backing sheet in which venting ducts are provided.
Figure 4:
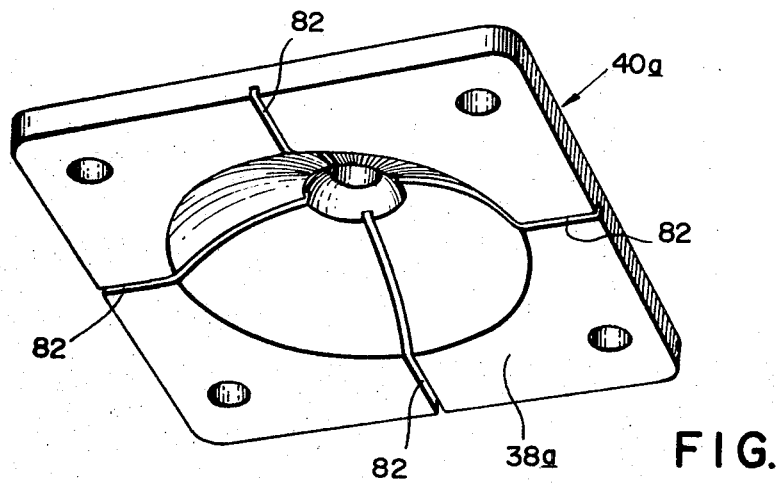
FIG. 4 is a perspective view of the backing sheet, but showing the modification of FIG. 2.
Figure 5:
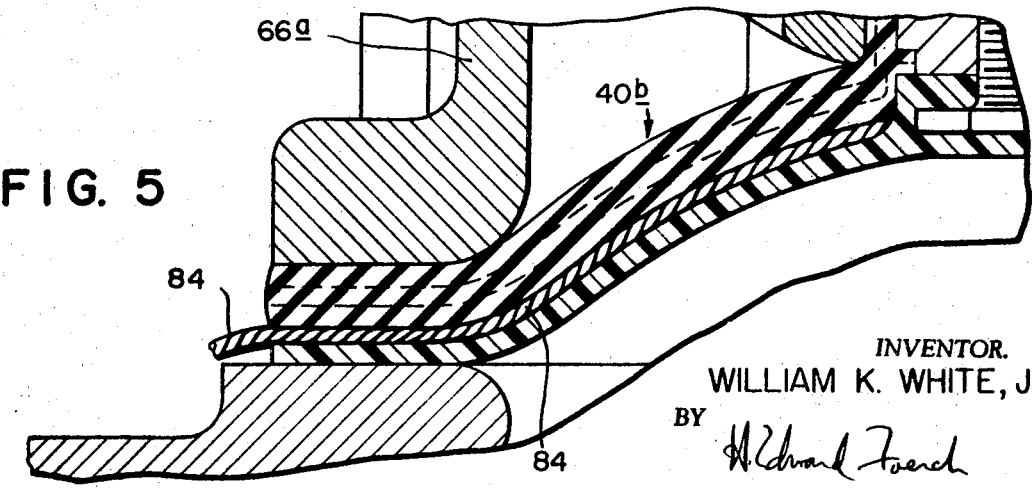
FIG. 5 is a further modification of FIG. 3.

In the modification shown in FIGS. 3 and 4, passages are provided to the outside of the valve by the provision of empty radial grooves 82 in the face 38a of the backing sheet 40a. These grooves are large enough so that these grooves do not collapse as a result of the drawing together of the flanges of the body and bonnet. Grooves which are large enough in this respect have a depth of at least one-eighth of the backing sheet thickness and a width equal to this depth, both measured when the backing sheet is unclamped. These grooves may contain wicks, 84 shown in FIG. 5, if desired. The grooves 82 by extending radially across the flange of the valve would function to conduct any fluid passing through a ruptured diaphragm to the outside of the valve and thereby give an indication that the diaphragm has ruptured.

I claim:
1. A diaphragm valve comprising:
   A. a body having a flow passage therethrough and a diaphragm opening which communicates with said passage, said body having a flange surrounding said diaphragm opening;
   B. a bonnet having a cavity with a valve-actuating mechanism therein, and said bonnet having a flange in opposing relation to said flange of said body member;
   C. a diaphragm having a margin clamped between said flange of said body and said bonnet, and having a central boss;
   D. a stud having a head portion embedded in said central boss of said diaphragm, and having a shank portion projecting toward said actuating mechanism in said bonnet;
   E. a backing sheet overlaying said diaphragm on the side thereof away from said diaphragm opening, said backing sheet having a margin clamped between said diaphragm margin and said bonnet, and having a central passage receiving said shank portion of said stud;
   F. a flange member positioned in said central passage of said backing sheet and being connected to said shank portion of said stud and to said valve-actuating mechanism, said flange member having a portion which extends laterally of said central passage and is embedded in said backing sheet;
   G. means connected to said flange member and responsive to lifting motion of said valve-actuating mechanism for applying a lifting force to said flange member, whereby lifting forces applied to said flange member are transmitted both to said backing sheet and to said diaphragm stud during opening of said valve.

2. A diaphragm valve according to claim 1, in which said flange member closes said central passage of said backing sheet, and grooves are formed in said backing sheet on the side thereof adjacent to said diaphragm and extending across said margins of said diaphragm and said backing sheet.

* * * * *